(12) United States Patent
Stevens

(10) Patent No.: US 9,937,853 B2
(45) Date of Patent: *Apr. 10, 2018

(54) LIGHT ASSEMBLY

(71) Applicant: Richard Stevens, Mehoopany, PA (US)

(72) Inventor: Richard Stevens, Mehoopany, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,575

(22) Filed: Oct. 17, 2017

(65) Prior Publication Data

US 2018/0037156 A1 Feb. 8, 2018

Related U.S. Application Data

(63) Continuation-in-part of application No. 15/297,299, filed on Oct. 19, 2016, now Pat. No. 9,821,714.

(60) Provisional application No. 62/243,261, filed on Oct. 19, 2015.

(51) Int. Cl.

| | |
|---|---|
| *B60Q 1/26* | (2006.01) |
| *G09F 13/00* | (2006.01) |
| *G09F 21/04* | (2006.01) |
| *B60Q 1/46* | (2006.01) |
| *B60Q 1/44* | (2006.01) |
| *B60Q 1/30* | (2006.01) |
| *F21S 8/10* | (2006.01) |
| *G09F 13/18* | (2006.01) |
| *F21V 23/00* | (2015.01) |
| *F21V 21/096* | (2006.01) |
| *F21V 23/04* | (2006.01) |

(52) U.S. Cl.
CPC ......... *B60Q 1/2607* (2013.01); *B60Q 1/2615* (2013.01); *B60Q 1/30* (2013.01); *B60Q 1/442* (2013.01); *B60Q 1/46* (2013.01); *F21S 48/21* (2013.01); *F21S 48/2212* (2013.01); *G09F 13/00* (2013.01); *G09F 13/005* (2013.01); *G09F 13/18* (2013.01); *G09F 21/048* (2013.01); *B60Q 2900/30* (2013.01); *F21V 21/096* (2013.01); *F21V 23/001* (2013.01); *F21V 23/04* (2013.01)

(58) Field of Classification Search
CPC ... B60Q 1/50; B60Q 1/46; B60Q 9/00; B60Q 9/008; B60Q 1/30
USPC .............................. 340/468–472, 425.5, 433
See application file for complete search history.

(56) References Cited

U.S. PATENT DOCUMENTS

| | | |
|---|---|---|
| 1,648,629 A | 11/1927 | Taylor et al. |
| 2,130,090 A | 9/1938 | Imhofe |
| 3,873,968 A | 3/1975 | Baader |
| 4,631,516 A | 12/1986 | Clinker |
| 4,833,448 A | 5/1989 | Chang |

(Continued)

*Primary Examiner* — Eric M Blount
(74) *Attorney, Agent, or Firm* — Global Intellectual Property Agency, LLC; Jordan Sworen

(57) ABSTRACT

A light assembly for a vehicle. The light assembly includes a housing having a front side and a rear side, wherein the rear side is removably securable to a vehicle. The front side of the housing includes a perimeter light, a center light, and a platform light, wherein the lights can alert vehicles approaching a stopping vehicle. The perimeter light is disposed around a perimeter of the housing and can produce an amber color. The center light includes an indicia in a non-colored transparent material and the platform light, disposed between the perimeter light and the center light, that produces a red color. In one embodiment, the light assembly is operably connected to remote control, allowing a user to activate and deactivate the light assembly.

10 Claims, 5 Drawing Sheets

(56) References Cited

U.S. PATENT DOCUMENTS

| | | |
|---|---|---|
| 5,299,109 A | 3/1994 | Grondal |
| 5,604,480 A | 2/1997 | Lamparter |
| 5,652,565 A | 7/1997 | Salcedas et al. |
| 6,020,814 A | 2/2000 | Robert |
| 6,449,889 B1 * | 9/2002 | Hottenstein ............... G09F 7/04 340/473 |
| 6,515,583 B1 * | 2/2003 | Lamparter ............. B60Q 1/503 340/433 |
| 7,068,160 B2 | 6/2006 | Tourneur et al. |
| 7,397,349 B2 | 7/2008 | Lahr et al. |
| 7,467,486 B2 | 12/2008 | Kaoh |
| 8,698,610 B2 | 4/2014 | Krugh |
| 9,153,150 B2 | 10/2015 | Fallon |
| D768,242 S | 10/2016 | Fallon |
| 9,589,486 B2 | 3/2017 | Haddad |
| 2004/0231209 A1 * | 11/2004 | Love ....................... G09F 13/02 40/591 |
| 2006/0226964 A1 | 10/2006 | Riesebosch |
| 2007/0103922 A1 | 5/2007 | Rissmiller et al. |

\* cited by examiner

LIGHT ASSEMBLY

CROSS REFERENCE TO RELATED APPLICATION

This application claims the benefit of U.S. Provisional Application No. 62/243,261 filed on Oct. 19, 2015 and U.S. Non-provisional application Ser. No. 15/297,299 filed on Oct. 19, 2016. The above identified patent applications are herein incorporated by reference in their entirety to provide continuity of disclosure.

BACKGROUND OF THE INVENTION

The present invention relates to light assemblies. More specifically, the present invention provides a light assembly having an indicia, such as the word 'caution' or 'stop' positioned thereon and flashing amber and red lights configured to alert drivers approaching a stopped vehicle, such as a school bus, that is picking up or dropping off children.

School buses often make frequent stops in the morning and in the afternoon when picking up and dropping off children. Conventional school buses have brake lights, flashers, and an integral stop sign, but sometimes these are not enough to alert drivers of approaching vehicles. In some circumstances, some drivers may not understand or be alerted to the requirement to stop for school buses when picking up or dropping off children. These drivers will choose to drive around the school bus or will not be able to stop in time and hit the bus. These situations are very dangerous for children having to cross a street or children sitting on the bus. Therefore, there exists a need for a light assembly that can more effectively alert drivers in advance that the school bus is going to stop and notify drivers of their requirement to stop or proceed with caution.

Devices have been disclosed in the known art that relate to light assemblies. These include devices that have been patented and published in patent application publications. These devices generally relate to flashing red and amber lights. These devices have several known drawbacks. These devices fail to provide a lighting feature with an outer amber perimeter, and an inner portion comprising red lighting with an indicia such as 'caution' or 'stop', whereby the lights activate and deactivate with the stopping of the school bus and the closing of the school bus door. Further, these devices fail to provide a portable light assembly that is operably controlled via a remote control.

In light of the devices disclosed in the known art, it is submitted that the present invention substantially diverges in design elements from the known art and consequently it is clear that there is a need in the art for an improvement to existing light assemblies. In this regard the instant invention substantially fulfills these needs.

SUMMARY OF THE INVENTION

In view of the foregoing disadvantages inherent in the known types of light assemblies now present in the prior art, the present invention provides a new light assembly wherein the same can be utilized for providing convenience for the user when safely picking up and dropping off children from a vehicle, such as a school bus.

It is therefore an object of the present invention to provide a new and improved light assembly that has all of the advantages of the prior art and none of the disadvantages. The light assembly comprises a housing having a front side and a rear side, wherein the rear side is configured to removably secure to a vehicle. The front side of the housing comprises a perimeter light, a center light, and a platform light, wherein all three lights operate to alert vehicles approaching a stopping or stopped vehicle. The perimeter light is disposed around a perimeter of the housing and is adapted to produce an amber color. The center light comprises an indicia in a non-colored transparent material. The platform light is disposed between the perimeter light and the center light, wherein the platform light is adapted to produce a red color. In one embodiment, the light assembly is operably connected to a control, speedometer, and door assembly of a school bus, allowing the light assembly to automatically activate when the school bus stops and automatically deactivate when the bus door closes. The perimeter light is manually controllable via the control. In an alternative embodiment, the light assembly is portable and operably connected to a remote control that can wirelessly activate and deactivate the lights of the assembly.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
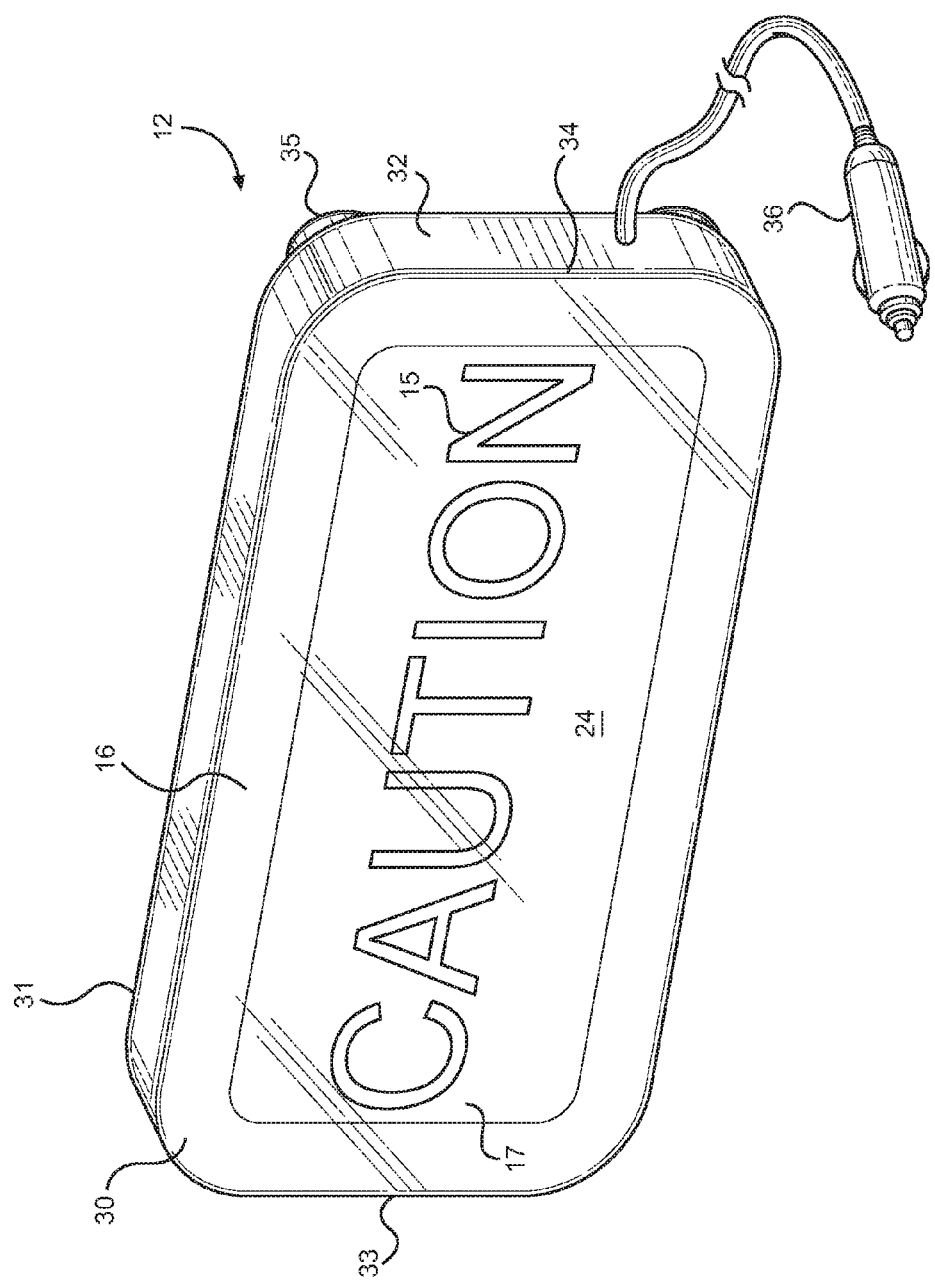
FIG. 1 shows a perspective view of an embodiment of the light assembly.

Reference is made herein to the attached drawings. Like reference numerals are used throughout the drawings to depict like or similar elements of the light assembly. For the purposes of presenting a brief and clear description of the present invention, the preferred embodiment will be discussed as used for safely picking up and dropping off children from a school bus. However, in an alternative embodiment, the light assembly can be used with any vehicle. The figures are intended for representative purposes only and should not be considered to be limiting in any respect.

Referring now to FIG. 1, there is shown a perspective view of an embodiment of the light assembly. The light assembly comprises a housing 12 having a front side 30 and a rear side 31, wherein the rear side 31 is configured to removably secure to a school bus via a plurality of fasteners 35. In the illustrated embodiment, the light assembly is configured to be portable, wherein the plurality of fasteners 35 are magnets that removably secure the housing 12 to a metal surface of the school bus. However, in an alternative embodiment, the light assembly is configured to permanently secure to the bus using a plurality of fastener 35, such as screws. In such an embodiment, the light assembly is configured to connect to wiring used for existing caution and warning lights on a school bus. However, in the illustrated embodiment, the light assembly includes a power cord 36 that removably connects the housing 12 to a power source within the school bus.

In the illustrated embodiment, the housing 12 comprises a rectangular cross section. However, in alternate embodiments, the housing 12 comprises any suitably shaped cross section, such as an oval or a square. The front side 30 of the housing 12 comprises a perimeter light 16, a center light 15, and a platform light 17, wherein all three lights 15, 16, 17 operate to alert vehicles that they are approaching a stopping or stopped school bus. In the illustrated embodiment, the upper surface 24 of each of the perimeter light 16, the center light 15, and the platform light 17 are flush with one another so as to form a planar upper surface 24. An interior volume of the housing 12 comprises a control circuit and light sources for the lights 15, 16, 17.

The perimeter light 16 is disposed around a perimeter 32 of the housing 12 and is adapted to produce an amber color. In the illustrated embodiment, the exterior of the perimeter 32 of the housing 12, defining the exterior of the perimeter light 16, comprises an amber colored material such that a light source disposed within the housing 12 illuminates and produces an amber color when viewed from the exterior. In alternate embodiments, the housing 12 comprises an amber colored light source that illuminates the perimeter 32 of the housing 12. The perimeter light 16 is configured to illuminate and flash in order to alert approaching vehicles that the school bus is approaching a pick up or drop off point.

The center light 15 comprises an indicia, such as a seven character word 'caution' or a four character word 'stop,' to directly inform a driver of an approaching vehicle of what the driver is required to do, which is stop for a school bus picking up or dropping off children or proceed with caution. In the illustrated embodiment, the indicia is centrally located between the lateral sides 33, 34 of the housing 12 in a non-colored transparent material. In this way, the indicia will appear white when the center light 15 is illuminated.

The platform light 17 is disposed between the perimeter light 16 and the center light 15, wherein the platform light 17 is adapted to produce a red color. In the illustrated embodiment, the platform light 17 covers the entire space between the center light 15 and the perimeter light 16. In the illustrated embodiment, the upper surface 24 of the platform light 17 is composed of a red material such that when a light source is illuminated from within the housing 12 the platform light 17 appears as a red color. The platform light 17 is configured to flash simultaneously with the center light 15 so as to provide emphasis to the indicia.

Figure 2:
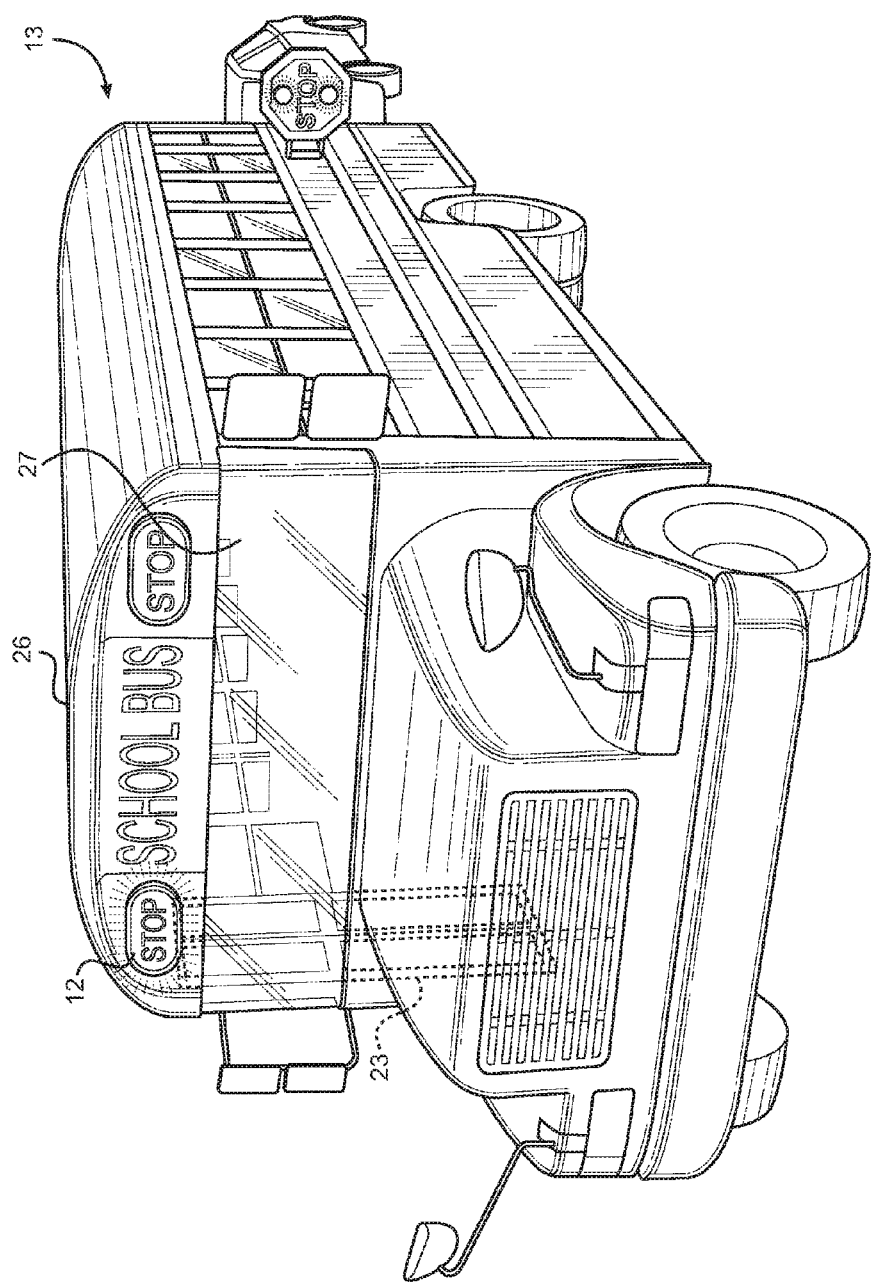
FIG. 2 shows a perspective view of the housing and lights attached to the front of a school bus.
Figure 3:
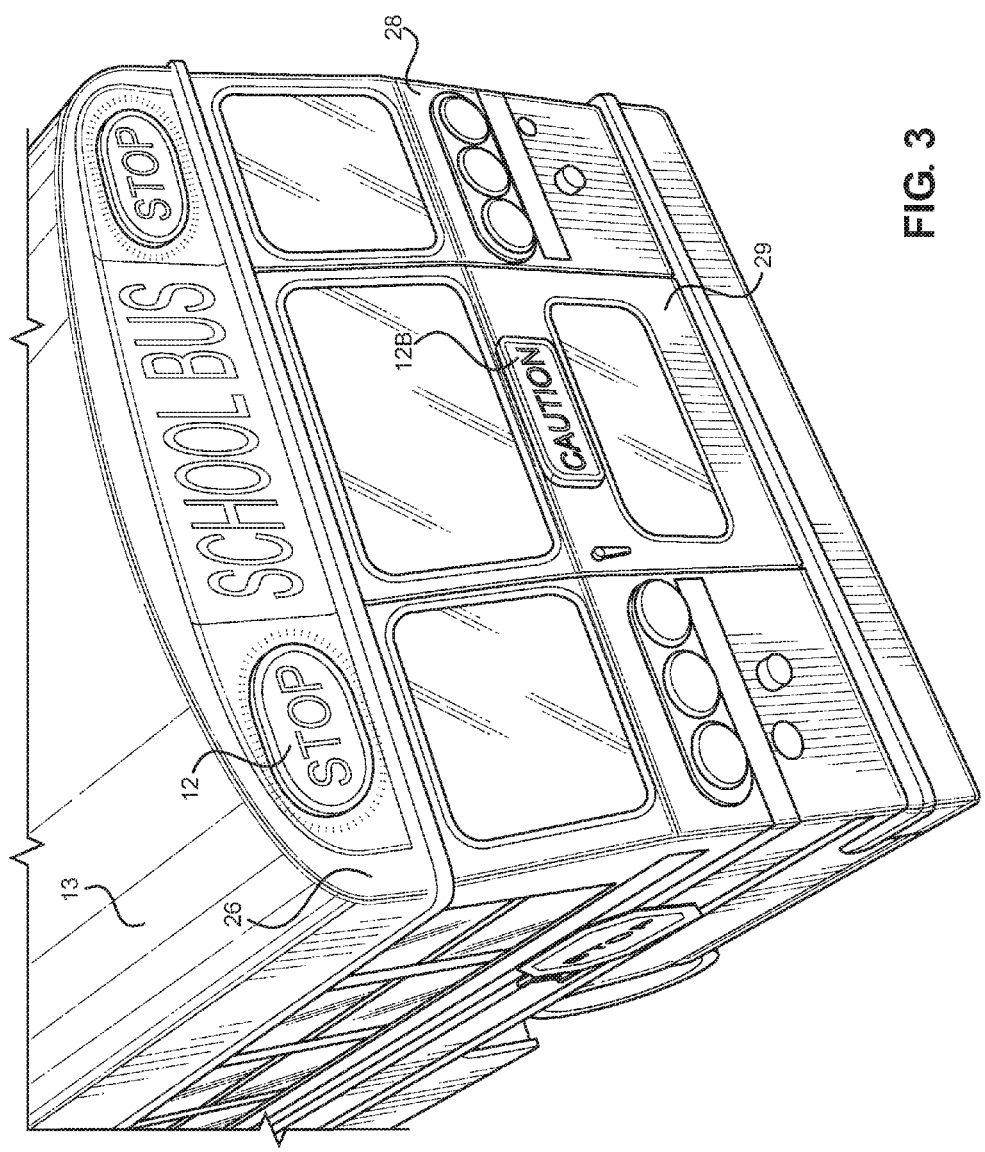
FIG. 3 shows a perspective view of the housing and lights attached to the rear of a school bus.

Referring now to FIGS. 2 and 3, there is shown a perspective view of the housing and lights attached to the front of a school bus and a perspective view of the housing and lights attached to the rear of a school bus, respectively. In the illustrated embodiment, the light assembly includes the school bus 13, wherein the housing 12 is secured to the exterior of the school bus 13. In the illustrated embodiment, there are four housings 12 placed around the upper end 26 of the school bus 13, wherein two are located on the front side 27 and two are located on the rear side 28. The four housings 12 are adapted to replace the caution and warning lights on an existing school bus and are operably connected to existing wiring previously used to operate the caution and warning lights. In some embodiments, a fifth housing 12B is positioned on the emergency door 29 located on the rear side 28 of the school bus 13. In the illustrated embodiment, the fifth housing 12B is a portable housing that removably secures to a metal surface of the school bus via magnets. This allows the device to be removably secured to any visible area on the school bus, such as a door or a sidewall, in order for drivers to see the indicia of the housing 12B.

Figure 4:
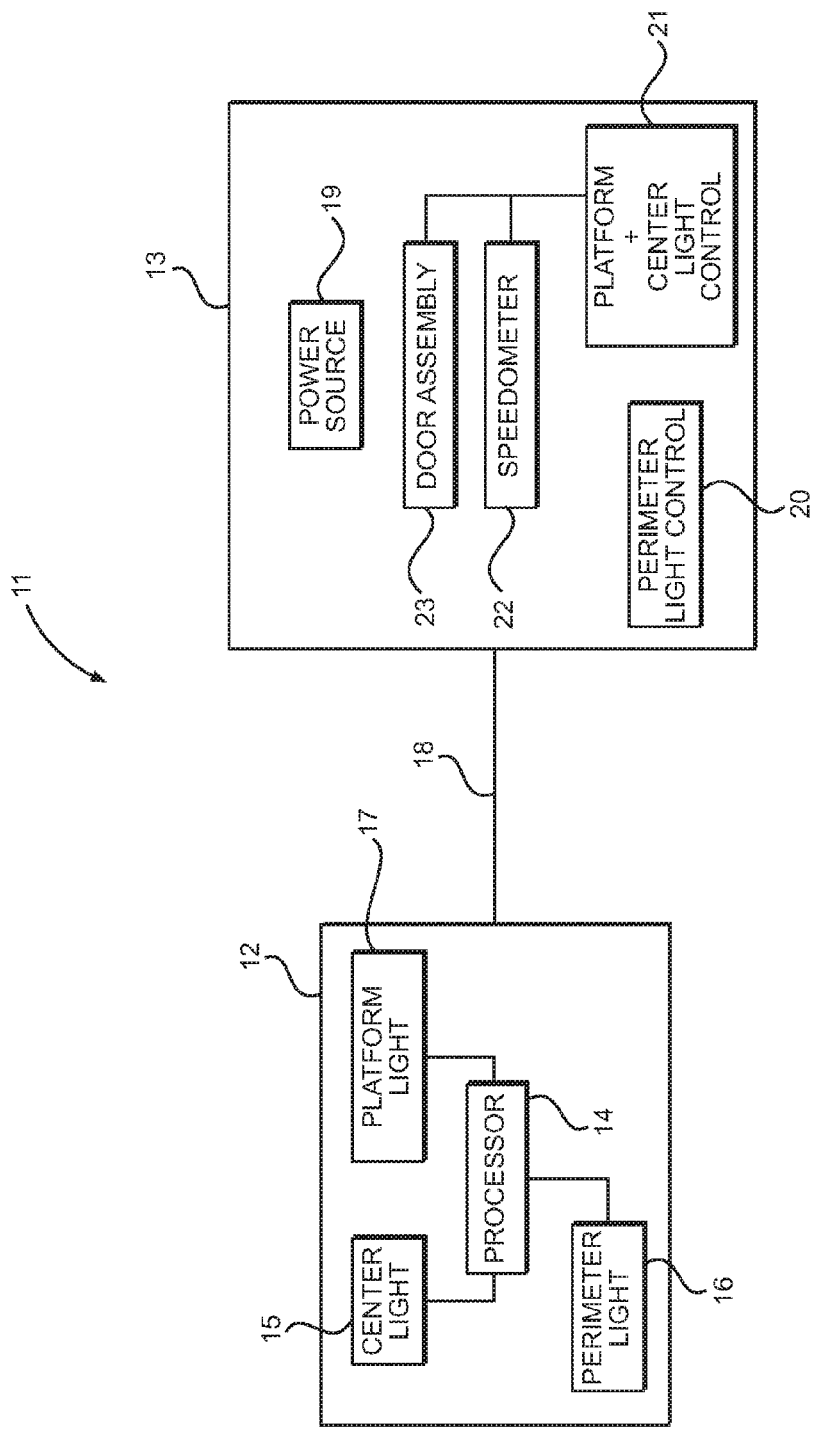
FIG. 4 shows a diagram of the control circuit of the light assembly.

Referring now to FIG. 4, there is shown a diagram of the control circuit of the light assembly. The light assembly 11 further comprises a control circuit configured to automatically and manually allow a user to operate the lights 15, 16, 17 in the housing 12. In one embodiment, the center light 15, perimeter light 16, and platform light 17 of the light assembly 11 are each operably connected to a processor 14 positioned within the housing 12. The processor 14 executes commands received by a perimeter light control 20 or a platform and center light control 21. In the illustrated embodiment, controls 20, 21 are electrically connected 18 to the lights 15, 16, 17 and the processor 14. Further, the processor 14 is configured to flash the perimeter light 16, the center light 15, and the platform light 17. In one embodiment, the center light 15 and platform light 17 are configured to flash simultaneously. In the illustrated embodiment, the controls 20, 21 are mounted on a school bus driver's control panel of the school bus 13 so as to be easily accessed by the user. The perimeter light control 20 comprises an on/off switch that allows a user to manually activate the perimeter light 16. In the illustrated embodiment, the lights 15, 16, 17 and controls 20, 21 are operably connected to and powered by a power source 19 disposed within the school bus, such as the engine battery.

In the illustrated embodiment, the platform light 17 and the center light 15 are operably connected to a door assembly 23 and a speedometer 22 of the school bus 13 via the platform and center light control 21. In the illustrated embodiment, the center light 15 and platform light 17 are configured to activate upon the speedometer 22 reading zero miles per hour and deactivate upon the detection of the door assembly 23 closing. In this way, the light assembly 11 is able to automatically activate when the school bus 13 stops and automatically deactivate when the school bus door assembly 23 closes. In alternate embodiments, the platform and center light control 21 comprises an on/off switch that allows a user to manually activate the platform light and center light.

In operation, a user or school bus driver activates the perimeter light 16 via the on/off switch of the perimeter light control 20 when he or she is within a predetermined distance from a drop off or pick up point, such as 150 feet. Upon activation the perimeter light control 20, the perimeter light 16 activates and produces a flashing amber colored light around the perimeter of the housing 12, at the upper end of the front and rear sides of the school bus 13. The flashing amber colored perimeter light 16 warns a driver of an approaching vehicle to slow down and use caution because children will be crossing the street. The school bus 13 comes to a complete stop in front of the drop off and pick up point, such that the speedometer 22 reads zero miles per hour. Once the speedometer 22 reads zero miles per hour, the center light 15 and platform light 17 of the housing 12 automatically flash in unison. Alternatively, the user may switch the platform and center light control 21 to a manual operation, such that the user can manually activate the platform and center lights 15, 17 if the driver of the school bus has to wait for children to arrive at the pick up point. Once the children have been dropped off or picked up, the door assembly 23 located on the side of the bus will close. Upon closing of the door assembly 23, the platform light 17 and center light 15 will automatically deactivate.

Figure 5:
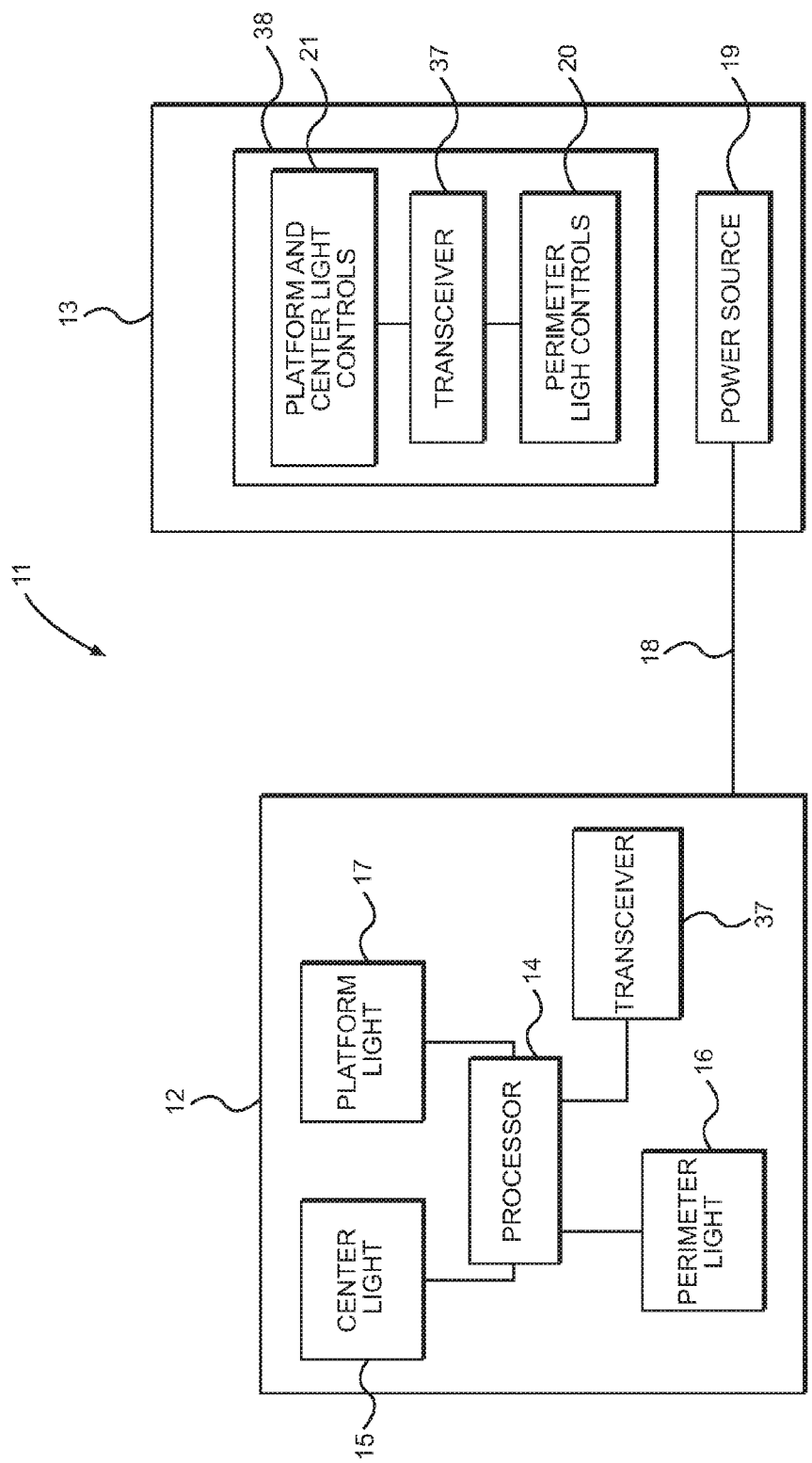
FIG. 5 shows a diagram of an embodiment of the light assembly, wherein the device is actuated by a remote control.

Referring now to FIG. 5, there is shown a diagram of an embodiment of the light assembly, wherein the device is actuated by a remote control. In the illustrated embodiment, the controls 20, 21 are wirelessly connected to the lights 15, 16, 17 and the processor 14 of the housing 12 via a remote control 38 disposed within the school bus 13. The remote control 38 and the housing 12 each contain a transceiver 37 that can wirelessly send and receive signals. In operation, a user can activate and deactivate the lights 15, 16, 17 of the assembly by actuating the platform and center light controls 21 and perimeter controls 20 disposed on the remote control 38. When the controls 21, 20 are pressed, a wireless signal is sent from the transceiver 37 of the remote control 38 and received by the transceiver 37 of the housing 12. This signal actuates the processor 14 within the housing 12 to activate or deactivate the respective light. In this way, when a vehicle or school bus is in the process of stopping or stopped to drop off or pick up a person, the user can operate the lights 15, 16, 17 via the remote control 38. This configuration provides a portable light assembly 11 that can be used on any vehicle, without the need to hardwire the lights to the control circuit of a vehicle. This allows a driver of a disabled vehicle or a driver assisting a disabled vehicle to warn approaching traffic to stop or proceed with caution by removably securing the housing to the vehicle.

In the illustrated embodiment, the light assembly 12 includes a power cord adapted to be electrically connected 18 to a vehicle power source 19, such as through a cigarette lighter adapter disposed within the vehicle. The power source 19 is adapted to power the lights 15, 16, 17 of the light assembly. In an alternative embodiment, the power source is configured as a rechargeable battery within the housing of the light assembly. This configuration allows the device to be completely portable, and obviates the need to plug the device into the power source of a vehicle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light assembly, comprising:
   a housing having a front side and a rear side, wherein the rear side is configured to removably secure the rear side to a school bus;
   a perimeter light disposed around a perimeter of the housing, wherein the perimeter light is configured to produce an amber color;
   a center light disposed on the housing, wherein the center light comprises an indicia in a non-colored transparent material;
   a platform light disposed between the perimeter light and the center light, wherein the platform light produces a red color;
   a power cord adapted to removably connect to a power source;
   wherein the light assembly is operably connected to a control.

2. The light assembly of claim 1, wherein the perimeter light comprises an amber colored transparent material, the center light comprises a non-colored transparent material, and the platform light comprises a red colored transparent material.

3. The light assembly of claim 1, wherein an upper surface of each of the perimeter light, the center light, and the platform light are flush with one another.

4. The light assembly of claim 1, wherein the rear side of the housing includes a plurality of fasteners.

5. The light assembly of claim 4, wherein the plurality of fasteners are magnets.

6. The light assembly of claim 1, wherein the control is configured as a wirelessly connected remote control.

7. The light assembly of claim 1, wherein the control is adapted to be installed within the school bus.

8. The light assembly of claim 7, wherein the center light and platform light are operably connected to a speedometer of the school bus, wherein the center light and platform light are configured to activate upon the speedometer reading zero miles per hour.

9. The light assembly of claim 7, wherein the center light and platform light are operably connected to a door assembly of the school bus, wherein the center light and platform light are configured to deactivate upon a closing of the door assembly.

10. A method of activating and deactivating a light assembly when removably secured to a school bus, comprising:
    activating a perimeter light of a light assembly via a perimeter light control disposed on a remote control, when the school bus is approaching a school bus stop;
    producing a flashing amber light from the perimeter light, wherein the perimeter light is disposed around a perimeter of a housing;
    deactivating the perimeter light via the perimeter light control;
    activating a center light and a platform light of the light assembly via a perimeter and center light control disposed on the remote control, wherein the center light and platform light automatically flash in unison;
    if a door assembly of the school bus is in a closed configuration, then deactivating the center light and platform light assembly via the perimeter and center light control.

* * * * *